(12) United States Patent
Larsson

(10) Patent No.: US 7,940,712 B2
(45) Date of Patent: May 10, 2011

(54) METHOD AND ARRANGEMENT FOR CODING AND SCHEDULING IN PACKET DATA COMMUNICATION SYSTEMS

(75) Inventor: Peter Larsson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 791 days.

(21) Appl. No.: 11/994,887

(22) PCT Filed: May 5, 2006

(86) PCT No.: PCT/SE2006/050107
§ 371 (c)(1),
(2), (4) Date: Jan. 10, 2008

(87) PCT Pub. No.: WO2007/008162
PCT Pub. Date: Jan. 18, 2007

(65) Prior Publication Data
US 2008/0212510 A1    Sep. 4, 2008

(30) Foreign Application Priority Data
Jul. 7, 2005  (WO) ............... PCT/SE2005/001144

(51) Int. Cl.
*H04H 20/71*    (2008.01)
(52) U.S. Cl. ........................................ 370/312
(58) Field of Classification Search .......... 370/312, 370/230, 386, 390, 432, 458; 713/153; 714/748
See application file for complete search history.

(56) References Cited

OTHER PUBLICATIONS

Jolfaei, M. A. et al. "Effective Block Recovery Schemes ARQ Retransmission Strategies." 5th IEEE International Symposium on Personal, Indoor and Mobile Radio Communications, 1994. Sep. 18-23, 2004, vol. 2, pp. 781-785.

Jolfaei, M.A. et al. "A New Efficient Selective Repeat Protocol for Point-to-Multipoint Communication." IEEE International Conference on Communications, 1993. May 23-26, 1993, vol. 2, pp. 1113-1117.

Larsson, Peter et al. "Multi-User ARQ." IEEE 63rd Vehicular Technology Conference, 2006 (VTC '06 Spring). May 7-10, 2006, vol. 4, pp. 2052-2057.

Tau, C.S. et al. "Performance Evaluation of the Loss-Collected Retransmission Scheme in Reliable Multicast Protocol." IEE Proceedings—Communications. vol. 153, Iss. 3, pp. 376-382.

Yong, S. et al. "XOR Retransmission in Multicast Error Recovery." IEEE International Conference on Networks, 2000 (ICON 2000), pp. 336-340.

*Primary Examiner* — Jeffrey Pwu
*Assistant Examiner* — Farhad Ali
(74) *Attorney, Agent, or Firm* — Coats & Bennett, P.L.L.C.

(57) ABSTRACT

The method and arrangement according to the present invention relates to scheduling and coding in communication systems utilizing automatic repeat request (ARQ) and/or multi-hop scheduling and forwarding. According to the inventive method the receiving nodes selectively stores received information, also overheard information, as a priori information and feed back information about their respective stored a priori information to a sending node. The sending node forms composite data packets by jointly encoding and scheduling multiple multicast data packets, and subsequently transmits the composite data packets to the receiving nodes. Upon receiving a composite data packet the receiving nodes uses their stored a priori information, comprising of regular multicast packets, or full or partly decoded composite packets comprised of regular multicast packets, in the process of extracting multicast data packets from the composite data packets.

34 Claims, 7 Drawing Sheets

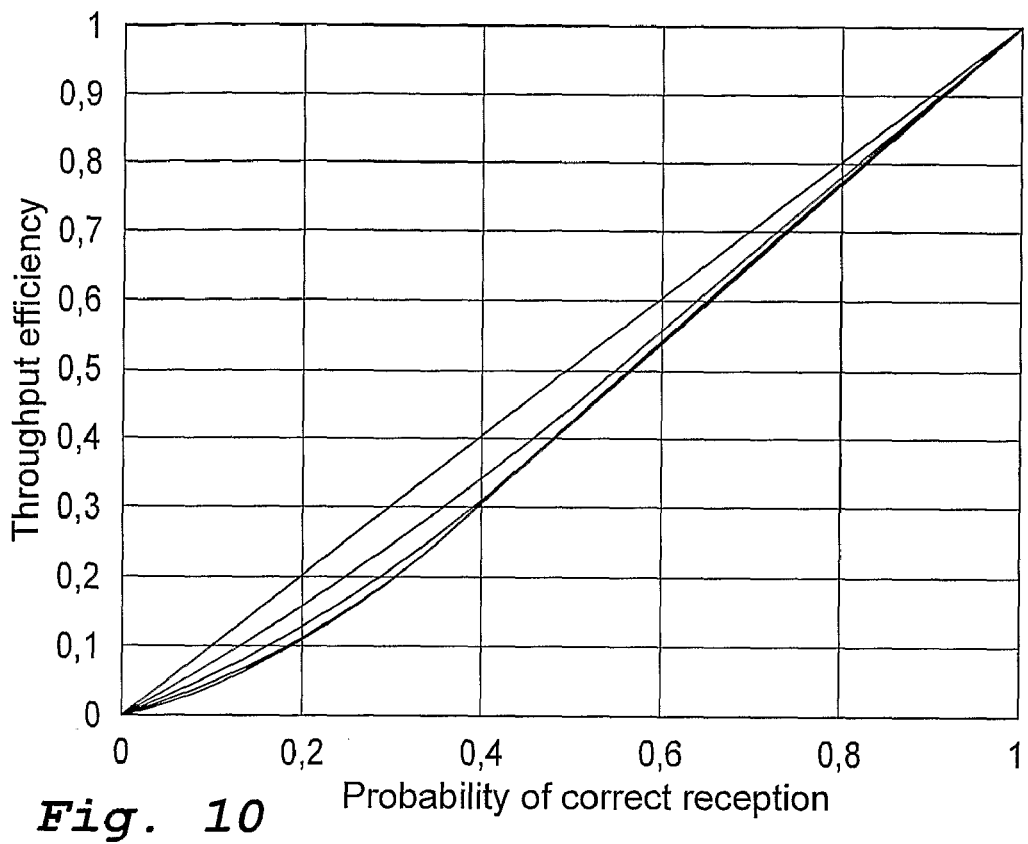
Fig. 10  Probability of correct reception
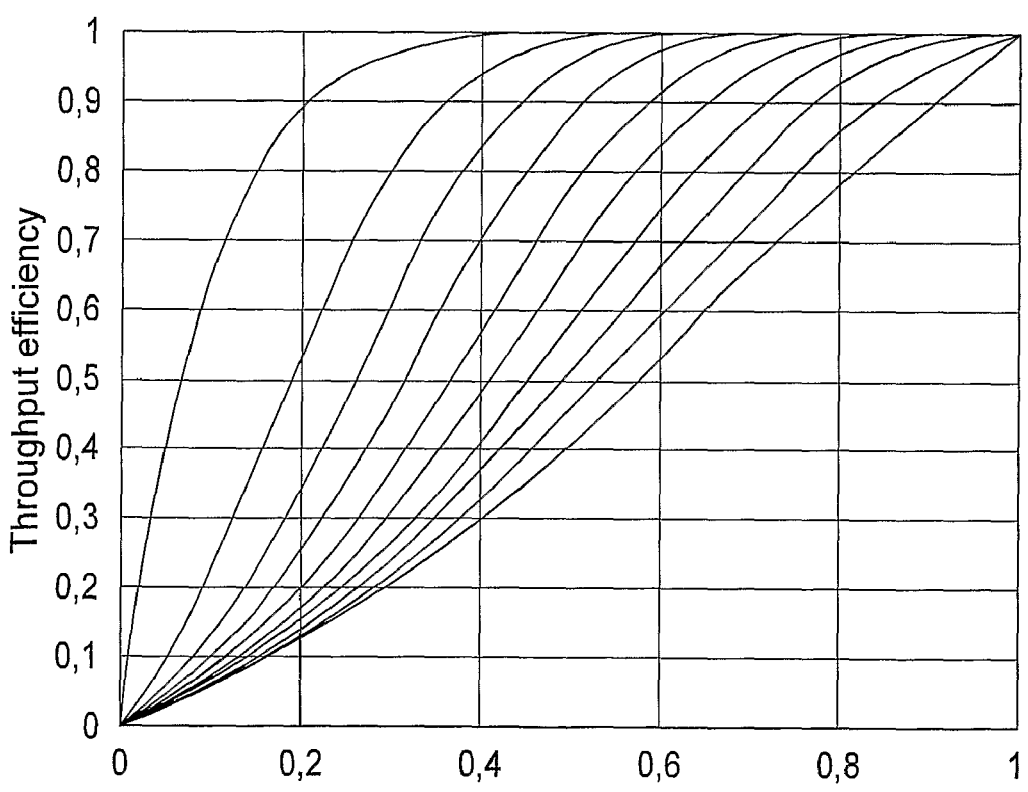
Fig. 11  Probability of correct reception

METHOD AND ARRANGEMENT FOR CODING AND SCHEDULING IN PACKET DATA COMMUNICATION SYSTEMS

FIELD OF INVENTION

The present invention relates to multicast communication between with at least one sending node and a plurality of receiving nodes.

BACKGROUND OF THE INVENTION

In communications systems, it is sometimes needed or desired to multicast the same data to multiple nodes, for certain application. When the channel is unreliable, it may not be possible to deliver the data to all receivers in a reliable way. Solving this problem is a challenge to protocol designers. Usually feedback messages from the receivers to the sender are used to enable the sender to determine which packets have been received correctly by the intended receivers and which ones have not. The packets that have not been received correctly must be resent. Multiple parallel unicast ARQ processes may be used to ensure reliable multicast. This is, however, an inefficient way of communication. It is typically considered more efficient to merge the parallel unicast processes into a single multicast ARQ process.

If there are K receivers, the term fully reliable multicast indicates that all packets should be received by all K receivers. The term k-reliable multicast indicates that each packet should be delivered to at least k of the K receivers.

Automatic repeat request (ARQ) is proposed to be used for the communication over the air interface in cellular wireless communication systems. ARQ could also be used in multihop systems. The data is, prior to the transmission, typically divided into smaller packets, protocol data units (PDU). A reliable transfer is enabled by encoding packets with an error detecting code, such that the receiver can detect erroneous or lost packets and thereby request a retransmission. The data sequence integrity is normally accomplished by sequential numbering of packets and applying certain transmission rules.

In the most simple form of ARQ, commonly referred to as Stop-and-Wait ARQ, the sender of data stores each sent data packet and waits for an acknowledgement from the receiver of a correctly received data packet, by the way of an acknowledgement message (ACK). When the ACK is received, the sender discards the stored packet and sends the next packet. The process is typically supplemented with timers and the use of negative acknowledgement messages (NACK). The sending entity uses a timer, which is started on the transmission of a data packet, and if no ACK (or NACK) has been received before the timer expires, the data packet is retransmitted. If the receiver detects errors in the packet, it can send a NACK to sender. Upon receiving the NACK, the sender retransmits the data packet without waiting for the timer to expire. If the ACK or NACK message is lost, the timer will eventually expire and the sender will retransmit the data packet.

Co-pending application PCT/SE 2005/001144 discloses an improved scheduling and coding method and arrangement exploiting the fact of information being received by other nodes in the system than the initially designated receiving node, that is suitable in communication systems utilizing automatic repeat request (ARQ) or multihop scheduling and forwarding, wherein the media is unreliable, is needed.

This co-pending application proposes a method and an arrangement for unicast facilitating the use of overheard, and previously discarded, information for improving the encoding and scheduling in a sending node. According to the method each receiving node selectively stores received information as a priori information and feeds back information about their respective stored a priori information to a sending node, for example, in the form of Acknowledgements messages. The sending node forms composite multicast data packets by jointly encoding and scheduling multiple data packets to multiple nodes, at least partly based on the feedback about the receiving nodes respective a priori information. The sending node transmits the composite multicast data packet to a plurality of receiving nodes. Upon receiving a composite multicast data packet the receiving nodes uses their stored a priori information in the process of extracting data for themselves from the composite multicast data packets. In addition, and in combination with the a priori information feedback, the sending node utilizes conventional feedback informing about received data packets.

The solution described in the co-pending application is applicable in multiple Unicast ARQ (e.g. in cellular and multihop systems) as well as in multihop systems where information overhearing may also stem from other senders than the sender node. The term multiple Unicast ARQ, in this context means that different data is targeted for each node.

The co-pending application does however not address multicast communication. A problem with traditional multicast ARQ is that the performance is poor when the number of nodes is large.

The following calculations are based on some assumptions: The nodes are assumed to have identical packet sizes, data rates and identical independent distributed (i.i.d.) reception probabilities. Further, non-sequence number limited ARQ, error free feedback, full buffers and a large number of packet analysis are assumed.

The throughput efficiency for fully reliable multicast can be derived and formulated through the recursive formula $$T_K = \frac{N'}{M' + M''} \qquad (1)$$
$$= \frac{N'/M'}{1 + M''/M'}$$
$$= \frac{1 - q^K}{1 + \sum_{j=1}^{K-1} \binom{K}{j} p^j q^{K-j} \frac{1}{T_{K-j}}}$$

where
T=throughput
N' is the number o packets received by a node
M' is the number of packets send in a first phase
M'' is the number of packets sent in a subsequent transmission
K is the number of nodes
q is the probability of failure
p is the probability of correct reception
j is the number of nodes that have received identical packets.

The motivation for (1) is that $M'(1-q^K)$ different packets are received by any node, when M' packets are sent in a first phase. In subsequent transmissions, M'', it is then the task to deliver any packet in this set to all K nodes. We note that after the first transmission, a packet may have been received by one or more nodes. A set of such packets where each packet have been received by the same j nodes, are here said to be a set of packets at "level j". There are K over j different such sets of each level, with $M'p^jq^{K-j}$ packets in each such set. The denominator is the normalized number of transmissions needed to deliver each packet to at least k nodes. The normalization is with respect to the initial number of transmissions in the firsts phase, M', hence the 1+sum throughput efficiency term in the denominator. In the sum of the denominator, we account for that each level j has a number of packets that takes on average $1/T_{K-j}$ transmissions per packet.

While the throughput is derived under the assumption of identical packet sizes, identical data rates and i.i.d. reception probabilities, in practise, different packet sizes, different data rated and non-identical (non-i.i.d) reception probabilities apply.

OBJECT OF THE INVENTION

It is an object of the present invention to achieve a more efficient communication method and apparatus for multicast traffic between a sending unit and a plurality of receivers in a communication network having unreliable links, such as in wireless communication networks.

SUMMARY OF THE INVENTION

This object is achieved according to the invention by a method of encoding and scheduling data packets in a communication system, the communication system comprising at least a sending node and at least two receiving nodes, and wherein the sending node is buffering, scheduling, encoding and transmitting multicast data packets comprising information designated to K receiving nodes, where K>1, the method being characterised in that:
- each receiving node feeds back information to the sending node regarding the multicast data packets it has received, as information of the a priori information; and
- the sending node forms a composite data packet based on previously transmitted multicast data packets, using the information of the a priori information
- the sending node transmits the composite data packet to the K receiving nodes.

The object is also achieved by a method in a sending node in a communication system of jointly encoding and scheduling multicast data packets, wherein the sending node is adapted for communication with K receiving nodes, where K>1, the method being characterised by the steps of:
- receiving feedback from each of the receiving nodes, said feed back comprising information regarding the multicast data packets it has received;
- forming a composite multicast data packet from at least two multicast data packets using the feedback information from at least two receiving nodes to select the at least two data packets
- transmitting the composite data packet to the K receiving nodes.

The object is also achieved according to the invention by a sending node adapted for use in a communication system, wherein the sending node is adapted for communication with K receiving nodes, where K>1, by transmitting information in the form of multicast data packets to said receiving nodes, said sending node comprising a buffer module for storing packets that are to be transmitted to the receiving nodes, and transmitting means for transmitting said multicast data packets to the receiving nodes, said sending node being characterised in that it comprises:
- a feedback receiver adapted to receive and identify feedback information from receiving nodes identifying the packets each receiving node has received;
- a multicast scheduling module comprising a joint coding and scheduling algorithm, the multicast scheduling module being arranged to use the feedback information to determine which multiple individual data packets to retrieve from the buffer module for use in the composite data packet;
- a composite packet encoding unit arranged to encode a composite packet as determined by the multicast scheduling module.

Therefore, according to the invention fewer data packets need to be sent from the sending node to the plurality of receiving nodes to ensure correct reception of transmitted data packets. If the number of bits used for the composite data packet is shorter than the sum of the number of bits of the regular data packets it is based on, this means a more efficient communication of multicast data packets.

Throughput is increased and the latency is reduced. The energy/power used in the communication system may be reduced for the same throughput and latency.

Preferably, the composite data packet is formed based on at least two regular multicast data packets.

The step of forming the composite data packet may comprise the following steps, typically performed by the multicast scheduling module:
- generating at least two different combinations of regular multicast packets to form the composite packet
- evaluating an objective function representative of the expected multicast performance for each generated combination
- selecting a generated combination that optimizes the objective function
- forming a composite packet according to the selected combination.

The objective function may, for example, use the expected throughput as performance measure.

This ensures that the composite multicast packets are formed in such a way as to optimize the throughput.

In a preferred embodiment, the method comprises the steps of
- selecting a level j, where 1<j<K and the level j is defined as the set of regular data packets wherein each packet has been received by j nodes in the preceding communication,
- considering a group of j nodes to determine if an optimal composite packet, that is, a packet from which any designated receiving node may decode one regular multicast data packet it has not yet received, can be formed for said j nodes.

If an optimal composite packet cannot be formed on level j, a new value for j. Alternatively, it may be considered whether a non-optimal composite packet can be formed on level j. Forming and transmitting a non-optimal composite packet may still be more efficient than transmitting the corresponding regular packets. More efficient still may be to wait until an optimal composite packet can be formed at level j.

A non-optimal composite packet may be formed and transmitted, for example, if at least one packet in at least one subset is approaching a maximum time to live.

In the case of k-reliable multicast, the method further comprises the step of defining a number k, where $1<k\leq K$ and k denotes the minimum number of receiving units that should receive a particular packet, and only using packets that have been received by at least one receiving unit but fewer than k receiving units to form composite packets.

When forming the composite multicast packet a number of encoding method can be used, which may be of low complexity. Preferably, a linear method is used, for example one of the following:

summation over a predetermined b-bit Galois field, such as bitwise XOR-operations, modulus-operations are utilized when forming the composite multicast packet.

In addition to the a priori information optimisation supplementary information may be used when forming the packet. In this case the sending node further comprises a supplementary information module in connection with the multicast scheduling module, said supplementary information module arranged to store supplementary channel information and to and to provide the multicast scheduling module with supplementary channel information. The supplementary information may, for example, comprise one of, or a combination of the parameters: Quality of Service requirements, Channel Quality Indication, routing costs, and data packet characteristics.

The multicast scheduling module may then be arranged to perform the scheduling and encoding based on information provided both from the feedback information storage module and the supplementary information module.

The receiving node partly decodes the composite data packet using its a priori information, wherein said partly decoded composite data packet forms a residual composite data packet and is stored by the receiving node as a priori information. The composite data packet may be stored in the receiving node as a priori information.

If the receiving nodes receive multicast data packets transmitted from a second sending node in addition to the first sending node, and in the feedback step the receiving nodes feed back to both the first and the second sending node, the first or the second sending node may be chosen to form and transmit the composite data packet.

Typically, but not necessarily, the communication system is a cellular system and the first sending node is a base station.

The invention also relates to a communication system comprising at least one sending node adapted for communication with at least two receiving nodes by transmitting information in the form of multiple individual data packets designated to individual receiving nodes, characterised in that the communication system comprises at least one sending node according to the above.

BRIEF DESCRIPTION OF THE DRAWINGS

The invention will now be described in detail with reference to the drawing figures, wherein:

FIG. 10 illustrates the throughput efficiency of fully reliable multicast multiuser ARQ for identical independent distributed reception probabilities according to invention.

FIG. 11 illustrates the throughput efficiency of k-reliable multicast multiuser ARQ for identical independent distributed reception probabilities according to the invention.

DETAILED DESCRIPTION OF THE INVENTION

In this document, the term "regular data packet" denotes a non-composite data packet, i.e. data packets of the type also used in prior art. A multicast data packet can be a regular data packet or a composite data packet. Hence, the term "regular data packet" in this document means a regular multicast data packet and the term "composite data packet" means a composite multicast data packet.

Figure 1:
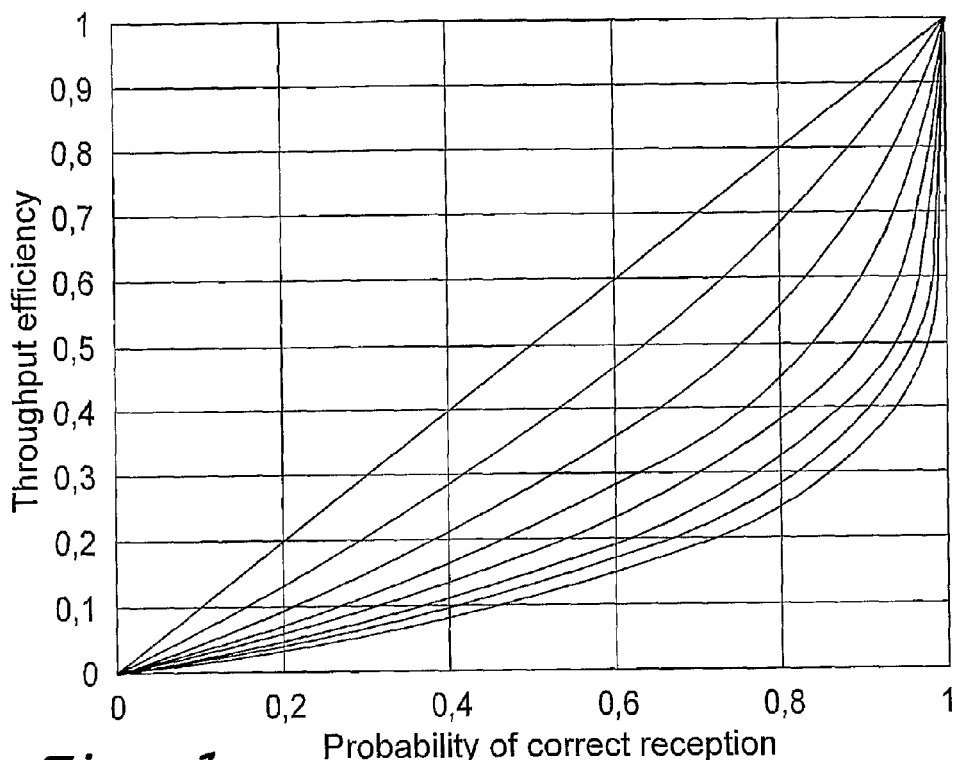
FIG. 1 illustrates the throughput efficiency of fully reliable multicast ARQ for identical independent distributed reception probabilities according to Prior Art.

FIG. 1 illustrates the throughput efficiency of fully reliable multicast ARQ. For K=1, 2, 4, 8, 16, 32, 64 and 128, as a function of the probability of correct reception. The leftmost curve illustrates the situation for K=1. As can be seen, the performance is reduced as the number K of nodes increases, and approaches zero when the number of nodes approaches infinity, except in the special case when the probability of correct reception equals 1.

Figure 2:
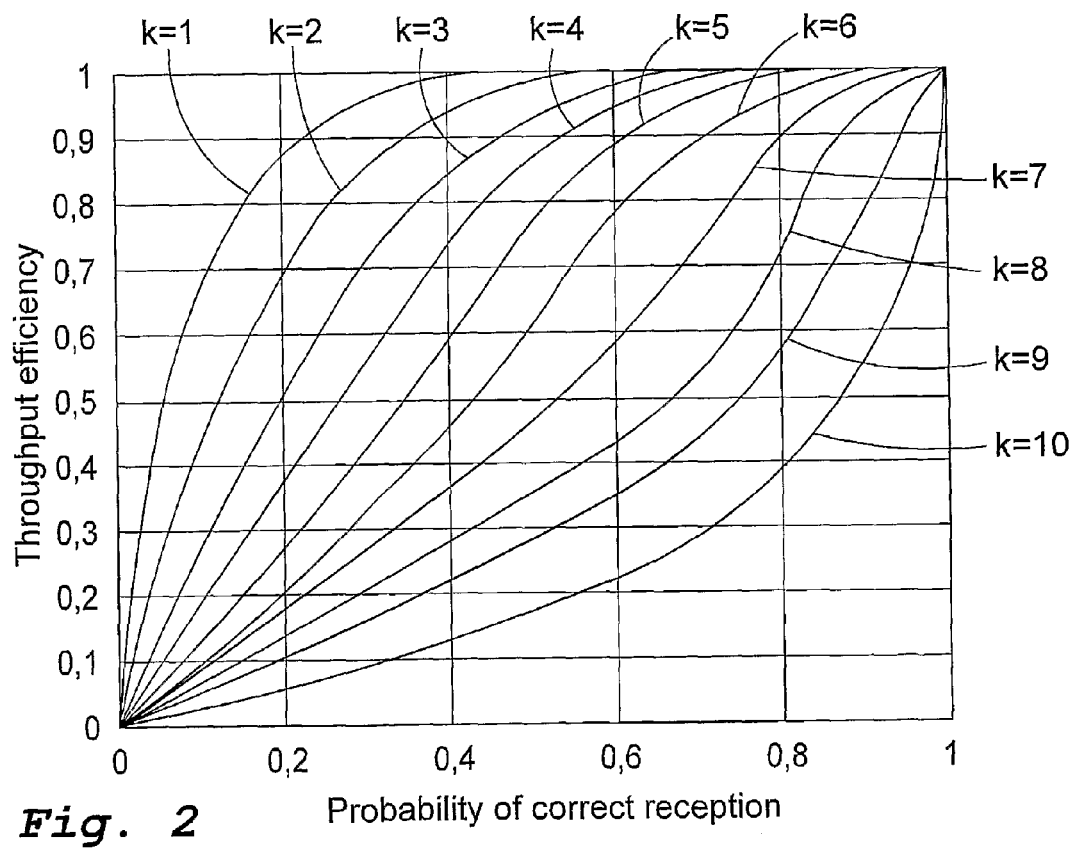
FIG. 2 illustrates the throughput efficiency of k-reliable multicast ARQ for identical independent distributed reception probabilities according to Prior Art.

FIG. 2 illustrates the throughput efficiency of k-reliable multicast ARQ for K=10, and k-1, 2, 4, ..., 10, as a function of the probability of correct reception. The leftmost curve illustrates the situation for k=1. As can be seen, the performance is reduced as k increases, that is, as more nodes are required to receive each packet, except in the hypothetical case when the probability of correct reception equals 1.

In the communication system according to the present invention, a sending entity is engaged in communication with multiple receiving entities. The sending entity, for example a base station (BS) in transmitting operation is referred to as a sending node (SN) and the receiving entity, for example realised as a mobile terminal (MT), in receiving operation is referred to as the receiving node (RN). It should be noted that a mobile terminal could also act as a sending node, and a base station as a receiving node. The present invention may advantageously be utilized both in typical cellular systems with a base station in communication with a plurality of mobile terminals and in multihop systems, wherein at least one mobile terminal communicates with at least two other mobile terminals to enable communication. As previously described, various scheduling schemes may be utilized in such systems to enhance performance and different types of ARQ-schemes may be used to increase the reliability of the transmissions.

Figure 3:
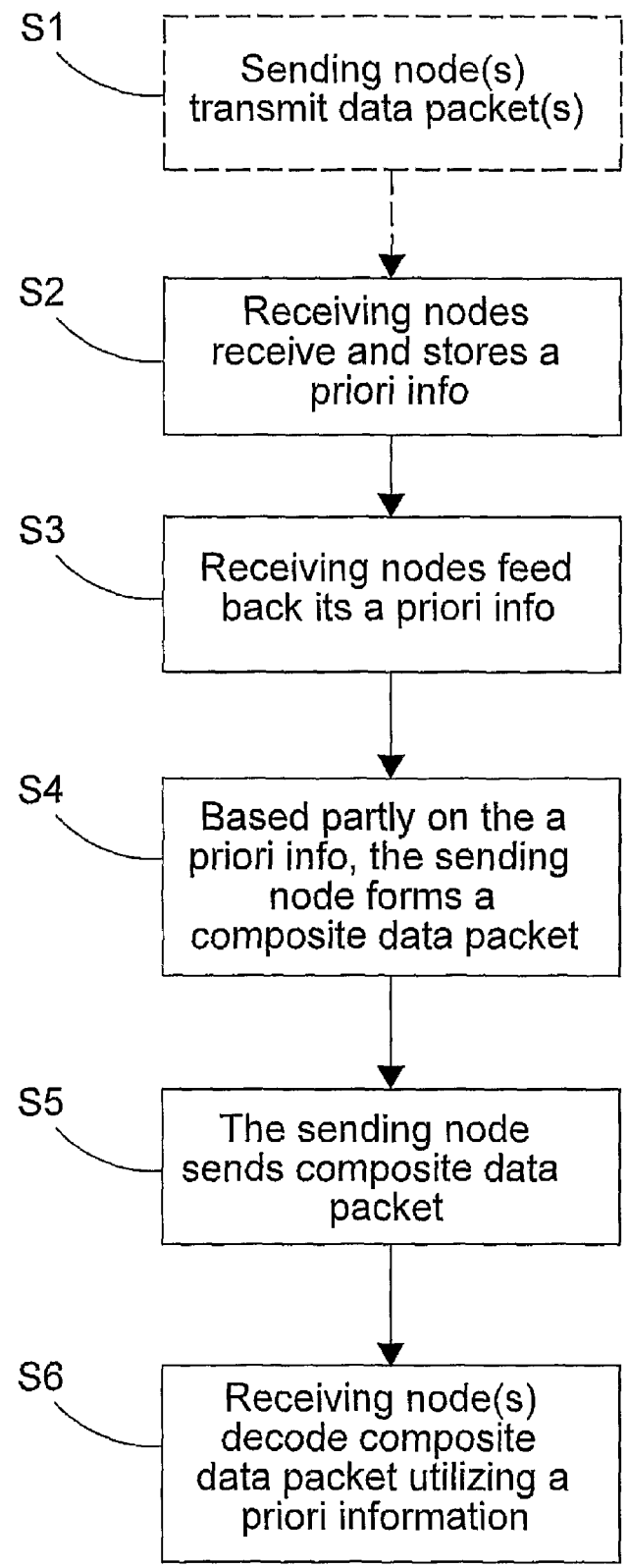
FIG. 3 is a flowchart over the method according to the present invention.
Figure 4:
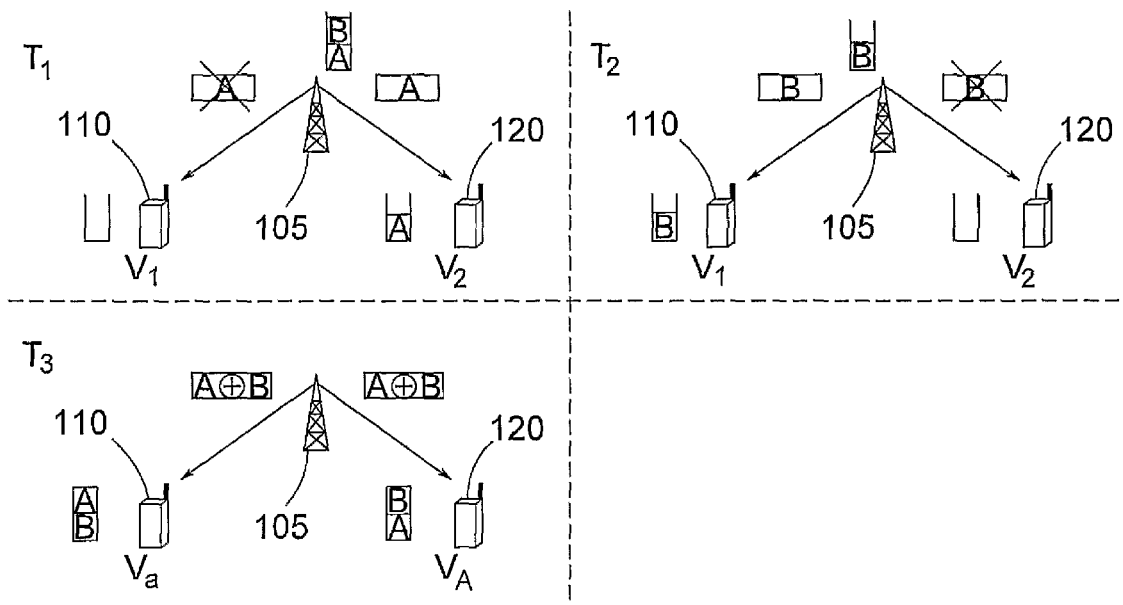
FIG. 4 is a schematic illustration of the transmission sequences in a communication system according to the present invention.

The principle on a high level of the method according to the present invention is illustrated in the flowchart of FIG. 3 and the schematic transmission scheme of FIG. 4. The method according to the invention is preferably preceded by an initial exchange of individual data packet, the preceding step S1 comprises:

Step S1: Data packets, here illustrated with packets (A) and (B), are sent from one or more radio nodes in sending operation, here sending node 105, to a plurality of receiving nodes 110, 120. Each individual data packet should be received by all receiving nodes, i.e. the data packets are "multicast data packets". The transmission of data packets may occur concurrently or subsequently, depending on transmission technology. There may be more than one sending node 105, for example for handover or in a macrodiversity scenario.

The method according to the invention comprises the steps of:

Step S2: The receiving nodes 110, 120 store the respective data packets that were correctly received. These packets may be used as a priori information.

Step S3: The receiving nodes 110, 120 feed back to the sending node 105, or sending nodes, information of the packets they have received.

Step S4: The sending node 105 forms, if possible and advantageous, a composite multicast data packet by using the fed back knowledge of respective a priori information from the receiving nodes 110, 120. The composite multicast data packet is formed based on multiple selected regular multicast data packets to be retransmitted. A characteristic of the composite multicast packet encoding is that the number of bits in the composite multicast packet is less than sum of the number of bits of the parts of the packets that are jointly encoded. The process will hereafter be referred to as joint encoding and scheduling, and will be further discussed and exemplified below. The sending node may form a plurality of different composite multicast packets to optimize the throughput efficiency. This step will be discussed in more detail in connection with FIG. 8.

Step S5: The sending node 105 transmits the composite multicast data packet to all receiving nodes.

Step S6: After receiving the composite multicast data packet, the receiving nodes 110, 120 decode, if possible, the composite multicast data packet and extract respective multicast data that was previously unknown to respective receiving node. In the decoding and extracting process, the multicast data packets previously decoded by the receiver, are utilized. The decoding procedure is discussed in detail in the above mentioned co-pending application. A difference however, is that in the co-pending application, data designated to other nodes are used as a priori information for decoding, whereas in the invention, all data are designated to all nodes.

Illustrated in FIG. 4 is a sending node, in this case a base station 105 in communication with two receiving nodes, $v_1$ and $v_2$, respectively, realised as the mobile terminal 110, and the mobile terminal 120. A multicast ARQ protocol is running between base station 105 and the mobile terminals 110, 120. The base station 105 has a buffer comprising the packets A and B, which should both be sent to both the receiving nodes $v_1$ and $v_2$. In the example illustrated in FIG. 4, at time $T_1$ the sending node, base station 105, sends information in form of data packet (A) to the mobile terminals 110, 120. The regular multicast data packet (A) was not received correctly by the mobile terminal 110 but by the mobile terminal 120.

At $T_2$ another data packet (B) is sent from the sending node 105 to the mobile terminals 110, 120. The regular multicast data packet (B) was not received correctly by the mobile terminal 120 but by the mobile terminal 110. Through the ARQ procedures the sending node 105 is provided with acknowledgement information.

Since none of the packets (A) and (B) were received by all intended recipients, they must both be retransmitted. Traditionally the sending node 105 would have to retransmit each packet (A) and (B) separately.

According to the invention, instead, at time $T_3$, the sending node 105 transmits a composite multicast data packet, here designated A⊕B implying bitwise XOR operation though not generally limited hereto, which is based on packets (A) and (B). The two receiving nodes $v_a$ and $v_A$ correctly receive the composite multicast data packet. As each receiving node has knowledge of one of the packets, it can decode the composite multicast data packet to obtain the information from the regular packet that it had not previously received. The methods for encoding and decoding are discussed below.

It should be noted that the transmissions in $T_1$ and $T_2$ could occur at the same time if a transmission technology allowing for concurrent transmissions, for example Orthogonal Frequency Division Multiple Access (OFDMA), is utilized, i.e. packet (A) and packet (a) are sent concurrently but on non-overlapping sets of OFDM subcarriers. The re-transmission could also occur concurrently.

According to the method and arrangement of the present invention, the sending node forms composite multicast data packets by jointly encoding and scheduling multiple data packets to multiple nodes at least partly based on the feedback on the receiving nodes respective a priori information. In addition, and in combination with the a priori information feedback, the sending node may utilize conventional feedback informing about received data packets. The composite multicast data packet is transmitted to the receiving nodes. Upon receiving a composite data packet the receiving nodes uses their stored a priori information in the process of extracting data for themselves from the composite data packets. Thereby, fewer data packets need to be sent from the sending node to the plurality of receiving nodes to achieve correct reception of transmitted data packets.

On occasion a receiving node may not have the full information needed to fully decode and extract own data from the composite multicast data packet. If this is the case the receiving node may partly decode the composite multicast data packet, and store the result, a residual composite multicast data packet, for further processing when other information is available. Alternatively the composite multicast data packet is stored without attempting to decode, until the receiving node has acquired all required information. Information on the information required to decode the major part of the composite multicast data packet may be comprised in a header. In the example, node 120 could extract (B) and node 110 extract (A).

An example of partial decoding is when a composite multicast packet is based on packets A, B and C, wherein only packet C resides in the receiving node. Then, the combination A encoded with B may be extracted in the decoding process, and subsequently stored as well as reported to the sending node (or including also other sending nodes). Note that the received packet status then indicates that A and B are still jointly encoded. A sending node may at the scheduling process include the knowledge of that the a priori information residing at one or more receiving nodes is at least partly jointly encoded. At the decoding in a receiver, it may exploit at least partly jointly encoded packet information as a priori knowledge in receiving and decoding a composite multicast packet.

For simplicity, the embodiment has been exemplified with only two receiving nodes. However, as realized by the skilled in the art given the above teachings, the method may be extended to a plurality of receiving nodes or groups of receiving nodes.

The transmission at $T_1$ and $T_2$ could occur at the same time if e.g. OFDMA is used, i.e. packet (A) and packet (B) are sent concurrently but on non-overlapping sets of OFDM subcarriers. Concurrent transmission of data packets, by e.g. OFDMA, can be used also in a multihop scenario. Other methods for concurrent transmission at $T_1$ and $T_2$ are not excluded by the invention as such.

Figure 6:
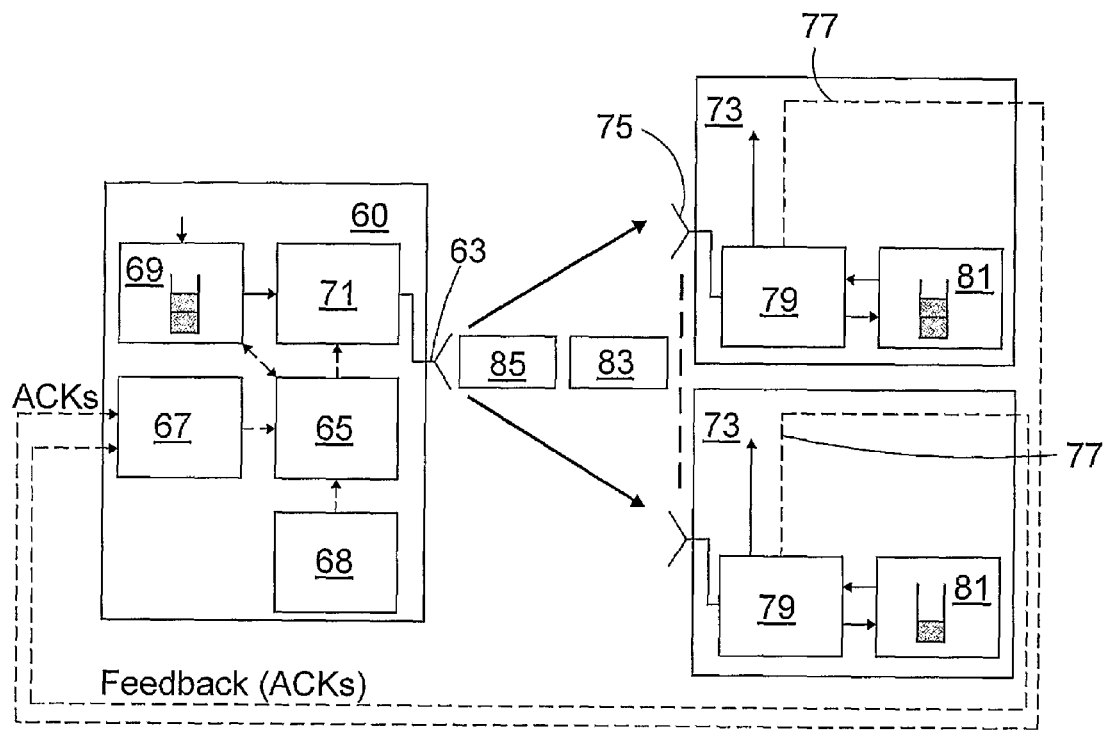
FIG. 6 is a schematic illustration of the transmitter and receiver according to the pre-sent invention.

An arrangement according to the present invention, suitable for effectuating the above described embodiments is schematically illustrated in FIG. 6. The modules and blocks according to the present invention described above are to be regarded as functional parts of a sending and/or receiving node in a communication system, and not necessarily as physical objects by themselves. The modules and blocks are at least partly preferably implemented as software code means, to be adapted to effectuate the method according to the invention. The term "comprising" does primarily refer to a logical structure and the term "connected" should here be interpreted as links between functional parts and not necessarily physical connections. However, depending on the chosen implementation, certain modules may be realized as physically distinctive objects in a receiver or transmitter.

The transmitter 60 of a sending node comprises transmitting means 63, which provides the necessary functionalities for performing the actual multicast transmission.

Suitable transmitting means for example radio-transmitting means is known to the skilled person. The transmitter 60 further comprises a multicast scheduling module 65, wherein the joint coding and scheduling algorithm resides. The scheduling module 65 is in communication with an ACK register 67; a data buffer module 69; and a composite multicast packet encoding unit 71. The transmitter typically also comprises means for handling unicast information (not shown). The multicast scheduling module 65 comprises means for the regular multicast ARQ operations.

The buffer module 69 provides temporarily stored packets that are to be provided to the receivers 73. Assuming that the transmitter 60 intends to send a packet, it considers what packet resides in the send buffers of the buffer module 69 and the ACK information of the different receiving nodes which is stored in the ACK register module 67.

Supplementary knowledge, provided by a supplementary information module 68, may also be used for the scheduling. Supplementary information may include, but is not limited to: Channel Quality Information (CQI) per link used in opportunistic scheduling, to be further described, QoS requirements, for the possibility to enhance the invention with QoS scheduling aspects, as well as status of individual packets, e.g. their time to live value.

The receiver 73 of a receiving node comprises receiving means 75, which provides the necessary functionalities for performing the actual reception. Suitable receiving means, for example radio receivers, is known to the skilled person. The receiver further comprises feedback means 77 for issuing and handling feedback messages, both ARQ-related and relating to a priori information; a decoding and CRC module 79 in connection with the receiving means 75; and a buffer 81 for storing packets that have not yet been delivered to k receiving units.

When a composite packet is received, the decoder 79 of the receiver 73 identifies which packets have been encoded together. Using the regular multicast data packets, and possibly also composite multicast data packets, stored in the buffer 81 the decoder then decodes the composite multicast packet. How to decode packets is discussed in detail in the co-pending application.

After a receiver 75 has successfully received an encoded data packet, it sends an ACK message to the sending unit 60 to confirm that it has received the packet, immediately or with a slight delay. The delay may be useful for not occupying resources and waste energy unnecessarily due to the overhead of each feedback packet. The update is achieved via the ARQ means of the receiver 73 and the ARQ means of the transmitter 60.

Moreover, note that the receiver 73 may also act as a transmitter if the data is subsequently forwarded. The same is true for the transmitter 60, i.e. it may also act as a receiver for other data.

Typically, as discussed in connection with FIG. 3, the sending node 60 first sends a number of regular packets 83. As feedback information becomes available from the receivers and composite multicast packets can be formed, the sending node also forms and sends composite multicast packets 85.

By utilizing regular packets that were not successfully received by all receiving units (or in the receiver stored undecoded or partially decoded composite packets), and by letting both the sending node (through feedback information) and the receiving node exploit these information, it is possible to reduce the number of transmissions needed to transfer a certain amount of data from one node to another, and in the multihop scenario from the source to the final destination. This will enhance the aggregate throughput as well as the single user (or equivalently, node) throughput. In addition, the end-to-end latency characteristics will be improved. Alternatively, depending on the conditions, the reduced number of transmissions can be used to improve power and energy efficiency in a sender and multiple receivers communication system.

Encoding Methods

The method for encoding suitable for the method according to the present invention is preferably based on XOR bitwise encoding, due to its simplicity. Other codes may also be used such as an erasure code like Reed Solomon. With respect to the Reed Solomon type of coding, the same operation as the XOR operation between two words is for instance possible if one selects a shortened RS code with K=2 and with N=3 codewords. The non-systematic codeword N−K=1 is resent instead of the two bitwise XORed words. Other erasure codes or erasure code oriented encodings may also be used.

Figure 5:
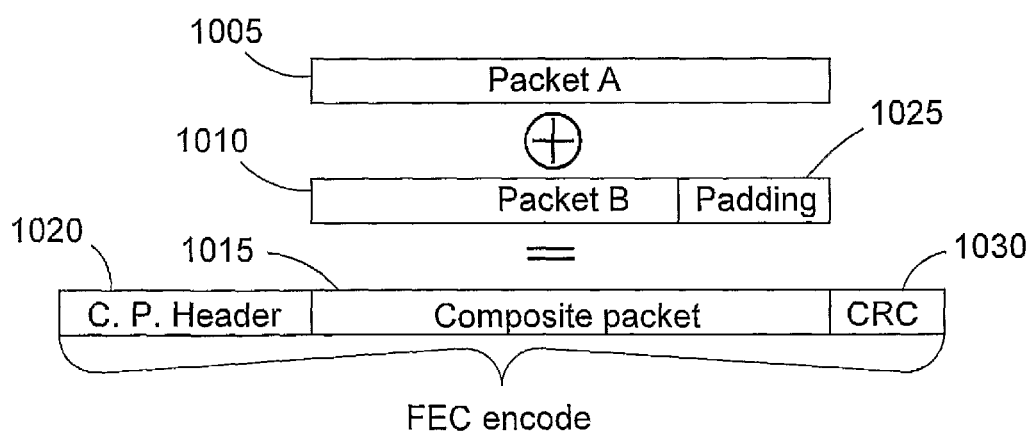
FIG. 5 is a schematic illustration of the composite multicast packet format according to one embodiment of the present invention.

Many different methods to jointly XOR encode and then identify which packets are jointly coded together may be envisioned. An example of possible code-frame formats is given with reference to the illustrations of FIG. 5. In the example, two data packets (A) 1005 and (B) 1010 are jointly coded to form the composite multicast data packet 1015. The payload can be XORed directly, but means for identifying, which individual packets where encoded together need to be offered. In one encoding method, FIG. 5, identifiers (e.g. headers or subset of relevant information from individual packet headers) of the involved jointly encoded packets (here only two packets are shown, but can easily be extended to more packets) are signalled in a composite packet header 1020. An identifier may for instance comprise sender address, multicast address, and packet sequence number for each encoded packet. Apart from the identifiers, the composite packet header also signals the format of the composite multicast packet, i.e. where the packets are placed in the composite multicast packet. For instance, if one has two packets and one of the packets contains fewer bits than the other packet, as in FIG. 5, the number of bits contained in the packet with fewer bits as well as the position of the first bit of the shorter packet is also indicated. When the number of bits differs, padding 1025 is utilized, as in FIG. 5 with packet B 1010. The format field of the composite packet header 1020 could also signal that two packets B and C are concatenated one after the other (not shown) and then encoded with e.g. a third packet A or more packets. After correct FEC decoding and detecting a correct CRC 1030, the exemplified composite packet header enables easy identification of which packets have been encoded together. The receiver uses this information to fetch the a priori known packet from the decoded data packets storage, and extract the other packet(s). It should be noted that the composite packet header may also contain other information, as in a multihop network, one may apart from packet identifiers be interested which relay station is sending and which relay stations shall receive.

Another encoding version than the one illustrated above (not shown) is to signal the composite packet header in a common broadcast message, i.e. a sort of out of band signalling. Yet a further encoding method (not shown), could involve a blind identification approach, i.e. testing hypothesis of encoded messages against the database of a priori information and using a CRC check to test the validity of the hypothesis testing.

The present invention is not limited to the use of XOR-operations in the encoding of the composite data packets. The coding operations are preferably adapted to the applied transmission technology, processing capacities, sensitivity to delays etc. A further example of an encoding operation suitable to use in the method according to the invention is based on the modulus operator. Per signal constellation symbol encoding is considered in the following, and the procedure can be repeated for multiple consecutive signal constellation symbols. The modulus operation is in this example performed both for the real and imaginary part independently when handling complex numbers and utilize a definition of the modulus operation and the mathematical observation that:

$$((A+B) \bmod L - B) \bmod L = (A) \bmod L,$$

which indicates that a real valued signal B can be superimposed on a real valued signal A and allow undisturbed recovery of the signal A (as long as the signal A does not exceed the quantization level L), while the amplitude (and hence the power) is limited of the (non-linearly encoded) composite signal.

In practice, this can be used as follows. The sender has symbols $S_1$ and $S_2$ that typically assumes distinct values. For instance in 16 QAM, $S_i \in \{-3, -1, 1, 3\} + i \cdot \{-3, 1, 1, 3\}$. Now, as the receiver has knowledge of the data sequence $D_2(n)$, it also has knowledge of the corresponding symbol $S_2$ (for every $S_1$). Then for the real part (and equally for the imaginary part), the jointly and encoded signal at the transmitter is $$(S_1^{(Re)} + S_2^{(Re)}) \bmod L,$$

which is then received and equalized, i.e. compensated for path loss (ensuring that same scale is used for the received signal and the signal that is subtracted), and complex phase (ensuring respective In-phase and Quadrature phase axis are aligned with the signal that is subtracted), to yield the received signal $$R^{(Re)} = (S_1^{(Re)} + S_2^{(Re)}) \bmod L + N^{(Re)},$$

where $N^{(Re)}$ is the noise (and interference) term. The desired signal is then recovered with $$\hat{S}_1^{(Re)} = ((R^{(Re)}) \bmod L - S_2^{(Re)}) \bmod L = (S_1^{(Re)} + N^{(Re)}) \bmod L$$

The non-linear encoding could also be accomplished by quantization by means of a higher dimensional lattice than just one dimensional quantization as has been described above. In this case the quantization operates on a vector rather than a scalar.

Feedback Messages

The feedback from the receiving node to the sending node is a part of the ACK-procedure. A feedback messages can be composed in various ways, for example depending on the transmission protocols used, ARQ-procedure etc.

The method and arrangement according to the invention is applicable in any network where packets may be sent more than one time. This is inherently the case in networks applying ARQ (due to retransmissions) as well as in multihop networks (due to that packets are generally forwarded over multiple hops as well as due to a potential implementation of Unicast ARQ). The invention has been described in a wireless scenario but could equally well be used in other communication scenarios.

Figure 7:
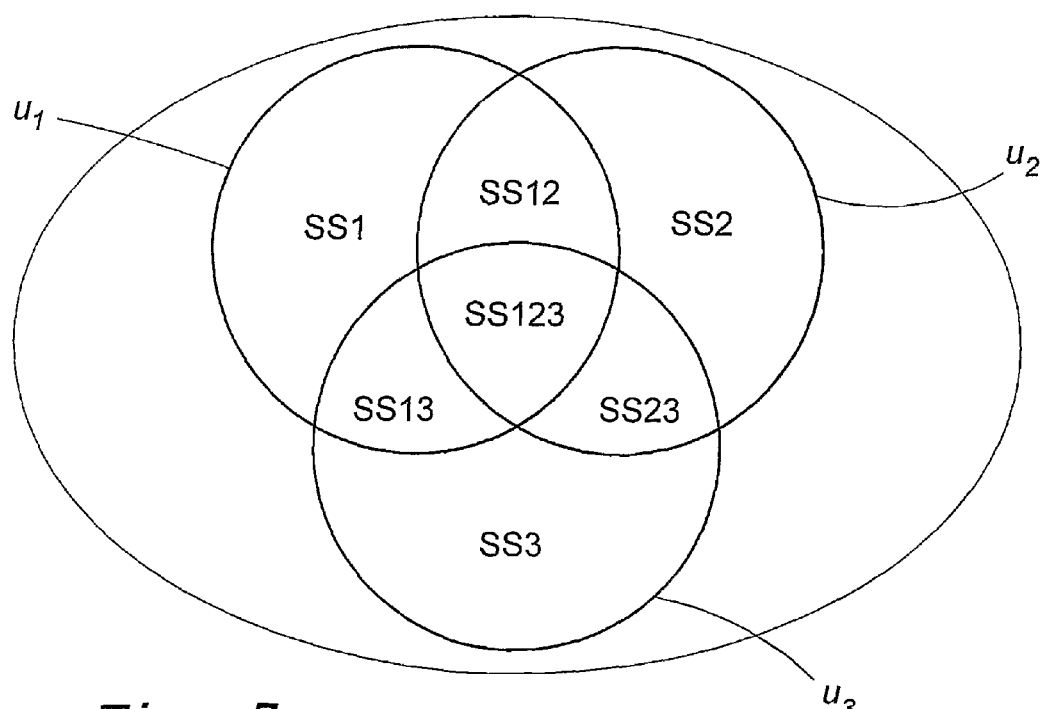
FIG. 7 illustrates a selection mechanism for packets to include in a composite multicast packet according to the invention.

FIG. 7 illustrates a method for selecting packets to combine to composite multicast packets, based on the assumption, which the invention is not limited to, that the first time a packet is sent, it is sent as a regular (i.e. non-composite) packet. Three receiving nodes u1, u2 and u3 are assumed. The multicast packets transmitted from the sender will be received by one or more of the receiving nodes, or by none of them. Hence, the set of transmitted regular multicast packets can be divided into eight subsets:

A subset of packets that were not received by any receiving node. These packets are preferably resent as regular packets.

A subset SS1 of packets received only by receiving node u1.

A subset SS2 of packets received only by receiving node u2.

A subset SS3 of packets received only by receiving node u3.

A subset SS12 of packets received by nodes u1 and u2.

A subset SS13 of packets received by nodes u1 and u3.

A subset SS23 of packets received by nodes u2 and u3.

A subset SS123 of packets received by all three nodes. These packets do not have to be retransmitted.

Figure 8:
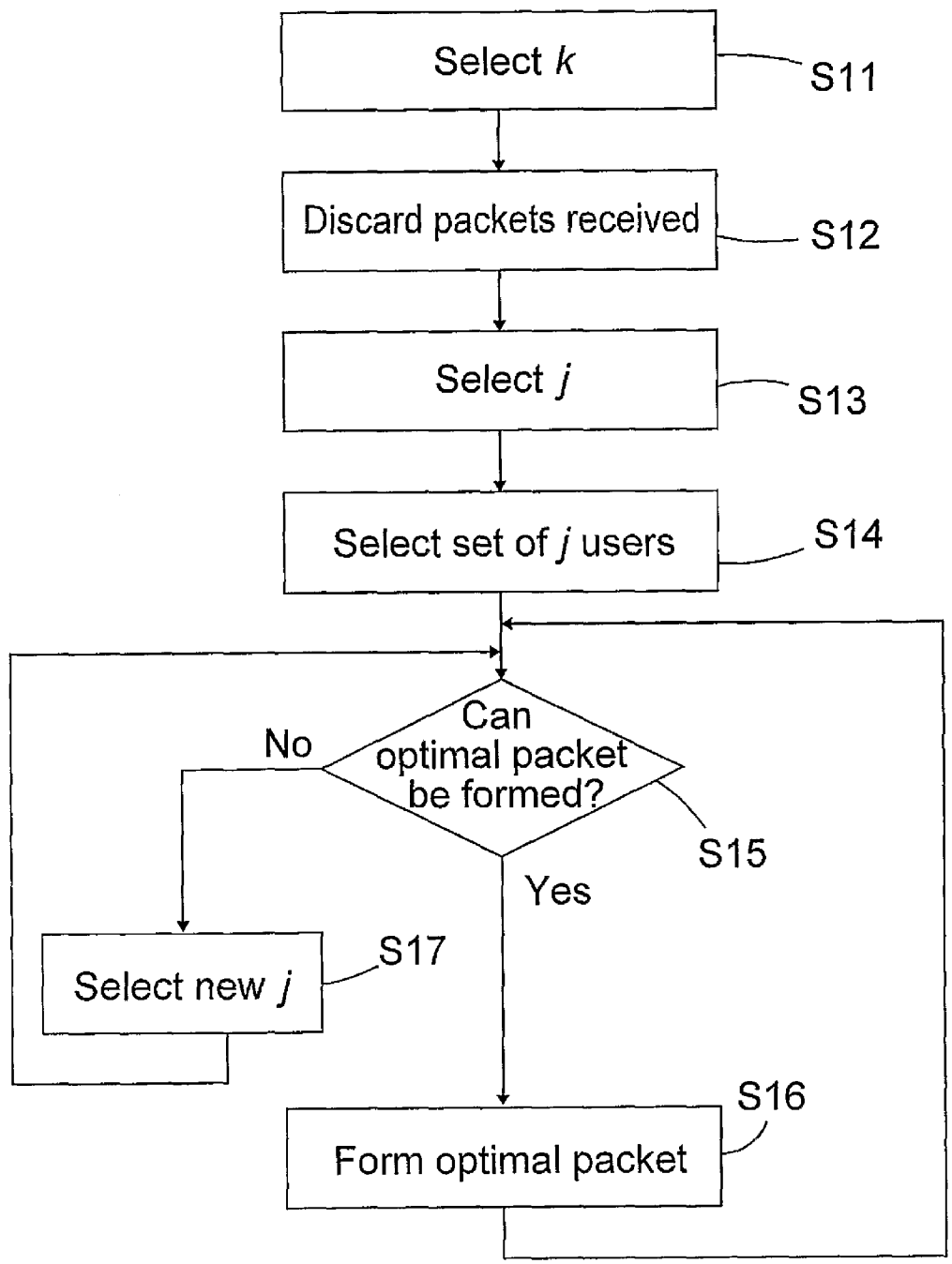
FIG. 8 is a flow chart of the scheduling method according to the invention.

A preferred embodiment of a multicast multiuser ARQ scheduling method will now be described, with reference to FIGS. 7 and 8. The scheduling method comprises the following steps, S11: decide the reliability level k. This level could be fixed, or preset for the system. It could also be determined in dependence of the flow. If fully reliable multicast is used, k=K.

S12: Discard all packets that have been received by at least k nodes.

S13: Determine which level j<k to consider. All levels $1 \leq j \leq k$ should be considered over time.

S14: determine a set of j nodes to consider. This set of nodes should preferably all have received j−1 identical packets and have one outstanding packet, in order to form an optimal composite packet. From an optimal composite packet, an addressed node may always decode and retrieve a new packet.

S15: Can an optimal composite packet be formed? If yes, go to step S16; if no, go to step S17.

S16: Form the optimal composite packet. Return to S14.

S17: If an optimal composite packet cannot be formed on level j, a different level j is selected. Return to S14.

If no optimal composite packet can be formed on any level j, several actions can be taken. The simplest is to continue sending regular packets until an optimal composite packet can be formed.

The initial level j selected in step S13, may be selected as j=1, or an arbitrary selected integer such that 1<j<k.

The method according to the present invention is preferably implemented by means of program products or program module products comprising the software code means for performing the steps of the method. The program products are preferably executed on a plurality of entities within a network. The program products are distributed and loaded from a computer usable medium, such as a USB memory, a CD, or transmitted over the air, or downloaded from Internet, for example.

To select the composite packet to be transmitted the transmitter may generate a number of possible combinations of regular multicast packets and evaluate an objective function representative of the expected multicast performance for each generated combination. The generated combination that optimizes the objective function may then be selected and a composite packet may be formed according to the selected combination.

Figure 9:
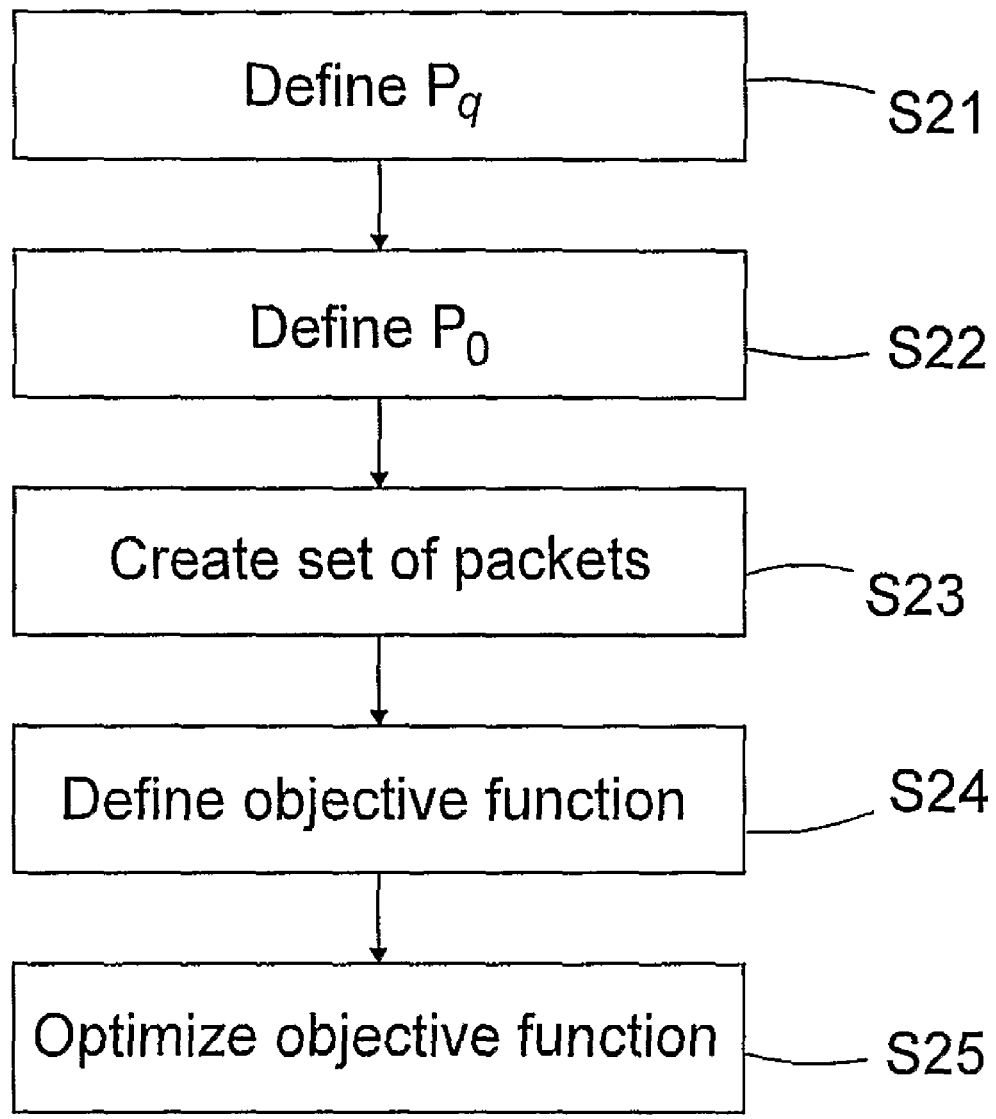
FIG. 9 is a flow chart of how a composite packet may be selected according to the invention.

This may be done according to the following, as shown in FIG. 9:

Step S21: Define the set comprising all packets received by a user q as $P_q$, where $1 \leq q \leq K$ Step S22: Define the set comprising all packets sent by the transmitter and not yet received by k users (where $1 < k \leq K$) as $P_0$.

Step S23: Create a set of different composite packets, $CP_m$, where m is the enumeration of the different composite packets.

Step S24: Define an objective function $f$, which is a measure of the expected performance of a transmission of a composite packet. The objective function representative of the expected performance has all sets Pq and CPm as arguments, i.e.

$$\text{Perf}(m) = f(P_1, P_2, \ldots P_K, CP_m)$$

To find the optimum composite packets (or a set of optimum composite packets and selecting one of those) the objective function is optimized, in step S25, by going through all possible created $CP_m$.

$$\text{Perf}_{opt} = \underset{\forall m}{opt} \text{Perf}(m)$$

A possible objective function is one that determines the expected throughput, i.e. it calculates the number of multicast packets that are successfully decoded from received composite packet, by means of exploiting the a priori information, by the users.

FIG. 10 illustrates the throughput efficiency of fully reliable multicast multiuser ARQ for K=1, 2, 4, 8 and ∞, and the lower value of K is to the upper left in the figure. As can be seen, the throughput efficiency is significantly increased compared to the prior art shown in FIG. 1, especially as K approaches infinity.

The throughput efficiency, under the simplifying assumption of i.i.d. reception probabilities can be derived and formulated as $$T = \frac{N'}{M' + M''} \quad (2)$$
$$= \frac{N'/M'}{1 + M''/M'}$$
$$= \frac{1 - q^K}{1 + \sum_{j=1}^{min(k-1,K-1)} \left( \binom{K}{j} p^j q^{K-j} \cdot \sum_{i=j}^{min(k-1,K-1)} \frac{1}{(i+1)p} \right)}$$

The rational behind (2) is the following. In a first transmission round of M' packets, $N' = M'(1-q^K)$ different packets are received by any node. Any packet on level $j < k-1$ needs to be communicated again until at least k nodes have received this packet. This communication take place with optimal composite packets according to scheduling method described above. All packets starting on level j will be "lifted" up to level j+1 after receiving an optimal composite packet. This needs to be repeated until at least k nodes have received this packet.

FIG. 11 illustrates the throughput efficiency of k-reliable multicast multiuser ARQ for K=10 and k=1, 2, 4, ..., 10, and the lower value of k is to the upper left in the figure. As can be seen, there is a significant increase in throughput efficiency as k approaches K.

It is noted in FIG. 10 and FIG. 11 that throughput efficiency $T > \text{const} \cdot p$, where the const is close to, but not equal to, one disregarding number of nodes K. I.e. the throughput efficiency does not approach zero when K→∞ as in Eq. (1). It is also noted in FIG. 11 that the k-reliable multicast performance is better than for prior art for all k (except when k=1 since composite packets can not be sent in that case).

While the invention has been described in connection with what is presently considered to be the most practical and preferred embodiments, it is to be understood that the invention is not to be limited to the disclosed embodiments, on the contrary, it is intended to cover various modifications and equivalent arrangements included within the scope of the appended claims.

The invention claimed is:

1. A method of encoding and scheduling data packets in a communication system, the communication system comprising at least one sending node and at least two receiving nodes, wherein the sending node is configured to buffer, schedule, encode, and transmit multicast data packets comprising information designated to K receiving nodes, where K>1, the method comprising:
receiving at the sending node feedback information from each receiving node, said feedback information regarding the multicast data packets received by each receiving node and stored at each receiving node as a priori information;
forming at the sending node a composite data packet based on previously transmitted multicast data packets using the received feedback information by:
generating at least two different combinations of multicast data packets to form the composite data packet;
evaluating an objective function representative of the expected multicast performance for each generated combination;
selecting a generated combination that optimizes the objective function; and
forming the composite data packet according to the selected combination; and
transmitting from the sending node the composite data packet to the K receiving nodes.

2. A method according to claim 1, wherein forming the composite data packet comprises forming the composite data packet based on at least two regular multicast data packets.

3. The method according to claim 1, wherein evaluating the objective function comprises evaluating the objective function using an expected throughput as a performance measure.

4. The method according to claim 1, further comprising:
selecting a level j defined as the set of multicast data packets wherein each multicast data packet has been received by j receiving nodes in the preceding communication, where $1 < j < K$; and
considering a group of j receiving nodes to determine if an optimal composite data packet may be formed for said j receiving nodes, said optimal composite data packet comprising a data packet from which any designated receiving node may decode one regular multicast data packet it has not yet received.

5. A method according to claim 4, further comprising selecting a new value for j if said optimal composite data packet cannot be formed on level j.

6. A method according to claim 4, further comprising considering whether a non-optimal composite data packet may be formed on level j if said optimal composite data packet cannot be formed on level j.

7. A method according to claim 1, further comprising forming a non-optimal composite data packet if at least one multicast data packet in at least one subset of multicast data packets is approaching a maximum time to live.

8. A method according to claim 1, further comprising:
defining a number k, where 1<k<K and k denotes the minimum number of receiving nodes that should receive a particular multicast data packet; and
using multicast data packets that have been received by at least one receiving node but fewer than k receiving nodes to form composite data packets.

9. The method according to claim 1, wherein forming the composite data packet comprises forming the composite data packet based on a summation over a predetermined b-bit Galois field.

10. The method according to claim 9, wherein said b-bit Galois field comprises a bitwise XOR-operation.

11. The method according to claim 1, wherein forming the composite data packet comprises forming the composite data packet based on modulus operations.

12. The method according to claim 1, wherein forming the composite data packet comprises forming the composite data packet based on the feedback information and optimization supplementary information.

13. The method according to claim 12, wherein the optimization supplementary information comprises one or more of Quality of Service requirements, a Channel Quality Indication, routing costs, and data packet characteristics.

14. The method according to claim 1, wherein the a priori information stored by each receiving node comprises residual composite data packets that are partly decoded based on the a priori information.

15. The method according to claim 1, wherein the transmitted composite data packet is stored at a receiving node as the a priori information.

16. The method according to claim 1, wherein the number of bits used for the composite data packet is shorter than the sum of the number of bits of the multicast data packets it is based on.

17. The method according to claim 1, wherein receiving the feedback information comprises receiving the feedback information at a first sending node, wherein forming the composite data packet comprises forming at the first sending node the composite data packet, and wherein transmitting the composite data packet comprises transmitting from the first sending node the composite data packet.

18. The method according to claim 17, wherein receiving the feedback information comprises receiving the feedback information at a second sending node, wherein forming the composite data packet comprises forming at the second sending node the composite data packet, and wherein transmitting the composite data packet comprises transmitting from the second sending node the composite data packet.

19. The method according to claim 1, wherein the communication system is a cellular system and the sending node is a base station.

20. A method in a sending node in a communication system of jointly encoding and scheduling multicast data packets, wherein the sending node is adapted for communication with K receiving nodes, where K>1, the method comprising:
receiving feedback from each of the receiving nodes, said feedback comprising information regarding the multicast data packets received by the receiving nodes;
generating at least two combinations of multicast data packets to form a composite data packet;
evaluating an objective function representative of the expected multicast performance for each generated combination;
selecting a generated combination based on the objective function;
forming the composite data packet according to the selected combination; and
transmitting the composite data packet to the K receiving nodes.

21. A method according to claim 20, wherein forming the composite data packet comprises forming the composite data packet from at least two regular multicast data packets.

22. The method according to claim 20, wherein evaluating the objective function comprises evaluating the objective function based on an expected throughput as a performance measure.

23. The method according to claim 20, wherein forming the composite data packet comprises forming the composite data packet based on XOR-operations.

24. The method according to claim 20, wherein forming the composite data packet comprises forming the composite data packet based on modulus operations.

25. The method according to claim 20, wherein forming the composite data packet comprises forming the composite data packet based on the feedback information and supplementary information.

26. The method according to claim 25, wherein the supplementary information comprises at least one of Quality of Service requirements, a Channel Quality Indication, routing costs, and data packet characteristics.

27. The method according to claim 20, wherein the number of bits used for the composite data packet is shorter than the sum of the number of bits of the two multicast data packets.

28. A sending node for use in a communication system, wherein the sending node is configured for communication with K receiving nodes by transmitting information in the form of multicast data packets to said K receiving nodes, where K>1, said sending node comprising a buffer module for storing multicast data packets that are to be transmitted to the receiving nodes, and a transmitter for transmitting said multicast data packets to the receiving nodes, said sending node comprising:
a feedback receiver adapted to receive and identify feedback information from receiving nodes identifying the multicast data packets each receiving node has received;
a multicast scheduling module comprising a joint coding and scheduling algorithm, the multicast scheduling module being arranged to use the feedback information to determine which individual multicast data packets to retrieve from the buffer module for use in a composite data packet, said multicast scheduling module configured to:
generate at least two combinations of multicast data packets to form the composite data packet;
evaluate an objective function representative of the expected multicast performance for each generated combination;
select a generated combination based on the objective function; and
form a composite data packet according to the selected combination; and
a composite packet encoding unit arranged to encode the composite data packet as determined by the multicast scheduling module for transmission to the receiving nodes.

29. The sending node according to claim 28, wherein the multicast scheduling module is configured to form the composite data packet based on at least two regular multicast data packets.

30. The sending node according to claim 28, wherein the objective function uses the expected throughput as performance measure.

31. The sending node according claim 28, further comprising a supplementary information module operatively connected to the multicast scheduling module, said supplementary information module arranged to store supplementary channel information and to provide the multicast scheduling module with supplementary channel information.

32. The sending node according to claim 31, wherein the supplementary information module is arranged to store at least one of Quality of Service requirements, a Channel Quality Indication, routing costs, and data packet characteristics.

33. The sending node according to claim 28, wherein the multicast scheduling module is configured to perform the scheduling and encoding based on information provided both from a feedback information storage module and the supplementary information module.

34. A communication system configured to transmit information in the form of multiple individual multicast data packets from one or more sending nodes to individual receiving nodes, wherein each sending node is configured for communication with K receiving nodes by transmitting information in the form of multicast data packets to said K receiving nodes, where K>1, wherein each sending node comprises a buffer module for storing multicast data packets that are to be transmitted to the receiving nodes, and a transmitter for transmitting said multicast data packets to the receiving nodes, said sending node of said communication system comprising:
 a feedback receiver adapted to receive and identify feedback information from receiving nodes identifying the multicast data packets each receiving node has received;
 a multicast scheduling module comprising a joint coding and scheduling algorithm, the multicast scheduling module being arranged to use the feedback information to determine which individual multicast data packets to retrieve from the buffer module for use in a composite data packet, said multicast scheduling module configured to:
  generate at least two combinations of multicast data packets to form the composite data packet;
  evaluate an objective function representative of the expected multicast performance for each generated combination;
  select a generated combination based on the objective function; and
  form a composite data packet according to the selected combination; and
 a composite packet encoding unit arranged to encode the composite data packet as determined by the multicast scheduling module for transmission to the receiving nodes.

* * * * *

UNITED STATES PATENT AND TRADEMARK OFFICE
CERTIFICATE OF CORRECTION

| | |
|---|---|
| PATENT NO. | : 7,940,712 B2 |
| APPLICATION NO. | : 11/994887 |
| DATED | : May 10, 2011 |
| INVENTOR(S) | : Larsson |

It is certified that error appears in the above-identified patent and that said Letters Patent is hereby corrected as shown below:

On the Face Page, in Field (56), under "OTHER PUBLICATIONS" in Column 1, Line 1, delete "Schemes ARQ" and insert -- Schemes for ARQ --, therefor.

In Column 17, Line 8, in claim 31, delete "according" and insert -- according to --, therefor.

Signed and Sealed this
Thirtieth Day of August, 2011

David J. Kappos
*Director of the United States Patent and Trademark Office*